(12) United States Patent
Sadov et al.

(10) Patent No.: US 12,399,747 B2
(45) Date of Patent: Aug. 26, 2025

(54) JOB ACCELERATION FOR WORKLOAD MANAGEMENT

(71) Applicant: BMC Software Israel Ltd, Tel Aviv (IL)

(72) Inventors: Mark Sadov, Tel Aviv (IL); Nathan Amichay, Tel Aviv (IL); Geert De Peuter, Turnhout (BE)

(73) Assignee: BMC Software Israel Ltd, Tel-Aviv (IL)

( * ) Notice: Subject to any disclaimer, the term of this patent is extended or adjusted under 35 U.S.C. 154(b) by 565 days.

(21) Appl. No.: 17/937,241

(22) Filed: Sep. 30, 2022

(65) Prior Publication Data
US 2024/0111589 A1   Apr. 4, 2024

(51) Int. Cl.
G06F 9/46        (2006.01)
G06F 9/50        (2006.01)

(52) U.S. Cl.
CPC .... *G06F 9/5038* (2013.01); *G06F 2209/5019* (2013.01); *G06F 2209/5021* (2013.01); *G06F 2209/505* (2013.01)

(58) Field of Classification Search
None
See application file for complete search history.

(56) References Cited

U.S. PATENT DOCUMENTS

| 12,026,546 | B2 * | 7/2024 | Herbert | G06F 9/4881 |
| 2004/0136533 | A1 * | 7/2004 | Takagaki | H04L 9/0891 |
| | | | | 713/153 |
| 2005/0060711 | A1 | 3/2005 | Ericsson et al. | |
| 2015/0293784 | A1 * | 10/2015 | Allen | G06F 9/48 |
| | | | | 718/102 |

OTHER PUBLICATIONS

Appdynamics part of Cisco, "Use A Dockerfile to Instrument Application," available online at <https://docs.appdynamics.com/appd/21.x/21.4/en/application-monitoring/install-app-server-agents/container-installation-options/use-a-dockerfile-to-instrument-applications>, Sep. 30, 2022, 3 pages.
Kubernetes, "Dynamic Admission Control," available online at <https://kubernetes.io/docs/reference/access-authn-authz/extensible-admission-controllers/>, last modified Jul. 1, 2022, 19 pages.

(Continued)

*Primary Examiner* — Bing Zhao
(74) *Attorney, Agent, or Firm* — Brake Hughes Bellermann LLP (57) ABSTRACT

At least one job path of a plurality of jobs of a workload may be traversed, each job of the plurality of jobs including job preparation operations and job logic operations, and having a job start condition. At least one job in the at least one job path may be selected to be an accelerated job, to thereby accelerate completion of the workload. The accelerated job may be scheduled to begin at a job preparation start time that is earlier than the job start time by at least a job preparation time used to complete accelerated job preparation operations of the accelerated job. Prior to the job start time, a wait command may be received from the accelerated job upon completion of the accelerated job preparation operations. The accelerated job may be released from the wait command to execute job logic operations of the accelerated job in response to the job start condition.

20 Claims, 7 Drawing Sheets

(56) References Cited

OTHER PUBLICATIONS

Kubernetes, "Pods," available online at <https://kubernetes.io/docs/concepts/workloads/pods/>, last modified Sep. 1, 2022, 6 pages.
New Relic, "What is Kubernetes and how should you monitor it?" available online at <https://newrelic.com/topics/monitoring-kubernetes-part-one>, 2022, 13 pages.
Extended European Search Report for European Application No. 23201080.1, mailed Feb. 22, 2024, 11 pages.
Papaefstathiou, V. et al.: "Prefetching and Cache Management Using Task Lifetimes", Database Compendex [Online] Engineering Information, Inc., Database accession No. E20132816491587; ICS 2013, ACM Int'l Conference on Supercomputing 2013, ACM, pp. 325-334, DOI: 10.1145/2464996.2465443.

\* cited by examiner

JOB ACCELERATION FOR WORKLOAD MANAGEMENT

TECHNICAL FIELD

This description relates to job management to ensure quality of service compliance in workload management.

BACKGROUND

Job management in the context of computing systems may include scheduling multiple jobs for execution, as part of a larger workload of jobs. For example, a batch of related jobs may be required to be completed by a specified deadline.

In many cases, however, it may be difficult to ensure that jobs execute in a desired manner or in a desired timeframe. For example, a difficulty of job management typically increases when a number of jobs being managed is very large. For example, some individual jobs may take longer than predicted to complete, which may cause the workload as a whole to be delayed. In other examples, one or more jobs may consume more computing resources than expected, thereby leaving insufficient computing resources available for executing other jobs in a timely manner.

In modern computing environments, it is often possible to allocate additional computing resources to attempt to ensure that a workload of jobs is completed on time. However, allocating additional computing resources to one or more jobs may be expensive, and may undesirably deplete resources available to other job(s). Consequently, it may be difficult to avoid a violation of a service level agreement, or some other undesirable outcome, in an efficient, cost-effective manner.

SUMMARY

According to some general aspects, a computer program product may be tangibly embodied on a non-transitory computer-readable storage medium and may include instructions. When executed by at least one computing device, the instructions may be configured to cause the at least one computing device to traverse at least one job path of a plurality of jobs of a workload, each job of the plurality of jobs including job preparation operations and job logic operations, and having a job start condition, and select at least one job in the at least one job path to be an accelerated job, to thereby accelerate completion of the workload. When executed by at least one computing device, the instructions may be configured to cause the at least one computing device to schedule the accelerated job to begin at a job preparation start time that is earlier than the job start time by at least a job preparation time used to complete accelerated job preparation operations of the accelerated job. When executed by at least one computing device, the instructions may be configured to cause the at least one computing device to receive, prior to the job start time, a wait command from the accelerated job upon completion of the accelerated job preparation operations, and release the accelerated job from the wait command to execute job logic operations of the accelerated job in response to the job start condition.

According to other general aspects, a computer-implemented method may perform the instructions of the computer program product. According to other general aspects, a system may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

DETAILED DESCRIPTION

Described systems and techniques enable, for example, acceleration of individual jobs or groups of jobs within a larger workload of jobs, so that the workload as a whole may be completed by a specified deadline, or otherwise comply with a relevant service level agreement(s) (SLA(s)). By monitoring a progress of an ongoing workload of jobs, for example, described techniques may determine that a remainder of the ongoing workload of jobs is in danger of failing to complete by a specified deadline. Then, described techniques may select individual jobs for acceleration in a manner that ensures that the workload will be in compliance with the deadline in question.

In order to accelerate a job currently scheduled to start at a particular job start time, described techniques may divide job operations of a job into job preparation operations, which may include job initialization operations, and job logic operations, which may refer to any operations that include processing data to contribute to completing a workload using allocated computer and/or network resources of the job preparation operations. Then, the job preparation operations may be scheduled for a preparation start time that is earlier than the original job start time.

In this way, for example, the job preparation operations (including the job initialization operations, if any) may be completed at or before the original job start time. As a result, any allocated resources may be available and ready for the job logic operations to commence. If needed, the allocated resources may be maintained until the original job start time is reached (and/or other job start conditions are met). Consequently, the job logic operations may begin immediately upon reaching of the originally designated start time.

In many cases, workload jobs may be serialized to some extent, so that multiple jobs execute in series with one another, and execution of a later job depends to some extent on a successful completion of an earlier job. In such scenarios and similar scenarios, described techniques may use the above-referenced techniques to introduce parallelism or multi-threading into a series of jobs, e.g., by executing job preparation operations of two or more jobs at least partially in parallel while maintaining job logic operations of the two or more jobs in series with one another. In this way, a series of multiple jobs may effectively be accelerated as part of a larger effort to meet a required deadline or otherwise meet a SLA.

Figure 1:
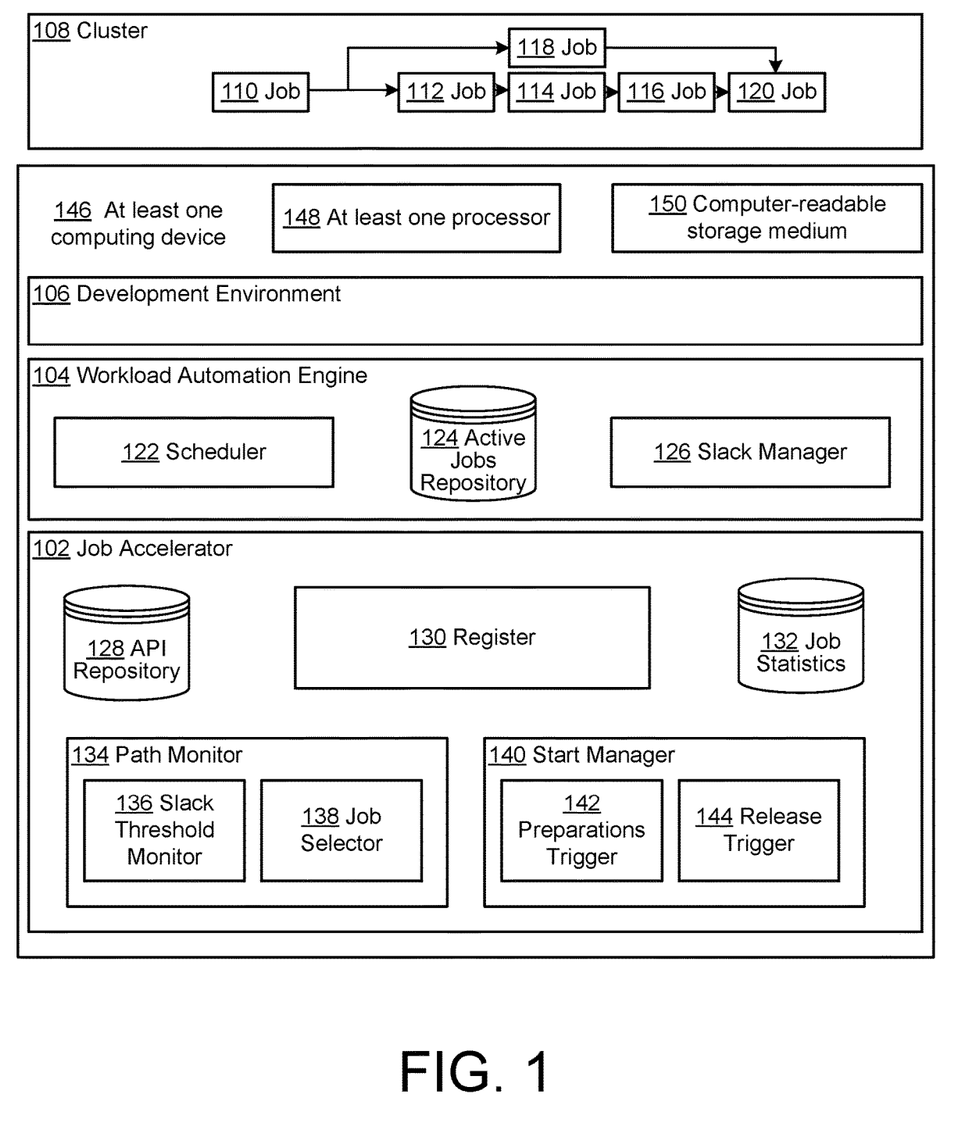
FIG. 1 is a block diagram of a system for job acceleration for job management.

FIG. 1 is a block diagram of a system for job acceleration for job management. In the example of FIG. 1, a job accelerator 102 facilitates, supports, and optimizes operations of a workload automation engine 104. The workload automation engine 104 may be configured to schedule and oversee execution of various jobs developed in the context of a development environment 106 and deployed onto one or more clusters illustrated in FIG. 1 as a cluster 108.

In the example of FIG. 1, the cluster 108 may represent one or more servers or other computing devices that have sufficient computing resources to execute jobs deployed by the workload automation engine 104. In FIG. 1, such jobs are illustrated in a simplified example with a job 110, a job 112, a job 114, a job 116, a job 118, and a job 120.

In more detail, the jobs 110-120 together may represent a workflow, batch, or other workload that includes the group of jobs 110-120 and that cumulatively provides some desired function or outcome. As shown, the job 110 occurs prior to a parallel execution of the job 118 with a serial execution of jobs 112, 114, 116, followed by the job 120.

Of course, the jobs 110-120 are intended merely as a simplified example of a workload, and should be understood to represent virtually any potential combination and number of jobs that may be executed using the cluster 108. Such jobs may include virtually any function that may be performed or provided by the cluster 108. For example, such jobs may include execution of one or more applications or application functions, including any function of a web page. Such functions may be provided in the context of any relevant business, governmental, or educational endeavor, including, e.g., healthcare, insurance, banking and finance, energy and oil and gas, manufacturing, industrial, or ecommerce settings.

Consequently, the cluster 108 should be understood to represent any suitable hardware and/or software that may be used to execute any such jobs in a particular context. For example, the cluster 108 may represent multiple servers used to provide deployable, redundant, scalable, reliable, and/or on-demand computing resources. Such resources may thus be part of a public or private cloud, including virtualized and/or containerized resources, as described below in the context of specific example implementations.

Similarly, therefore, the development environment 106 should be understood to represent any suitable collection of processes and tools with which the various jobs, represented by the jobs 110-120, may be designed and deployed for execution using the cluster 108. For example, the development environment 106 may use various types of programming languages and related libraries and other resources to create or modify code of a program or application. Various examples of aspects of the development environment 106 are provided below in the context of Kubernetes, but many other examples may be used, as well.

Once an application(s) and related jobs are created or modified in the context of the development environment 106, the workload automation engine 104 may be configured to deploy and manage execution of corresponding jobs, such as the jobs 110-120, in accordance with the developed code. For example, a scheduler 122 of the workload automation engine 104 may be configured to ensure that a group (e.g., batch, workflow, or other workload) of jobs of an active jobs repository 124 is scheduled to follow a desired order, complete by a specified deadline, or otherwise complies with various scheduling constraints.

For example, in the simplified example of FIG. 1, during normal operations, the scheduler 122 may be configured to ensure that the job 110 starts at a specified job start time, and that the job 110 completes before initiating either the job 118 or the job 112. Similarly, the scheduler 122 may ensure that the job 118 and the job 116 both complete before initiating the job 120. The scheduler 122 may be further configured to schedule completion of the job 120, and thus of the entire workload of jobs 110-120, by a specified deadline, or otherwise in compliance with a relevant SLA.

In order to perform these and related functions, the workflow automation engine 104 may be configured to assign, request, or otherwise allocate resources of the cluster 108 for use by corresponding ones of the jobs 110-120. For example, different ones of the jobs 110-120 may require different quantities or types of data, memory, processing, network connections, data access, and other resources. The various jobs 110-120 may then use the allocated resources to perform their specified job logic operations.

The workflow automation engine 104 may determine estimates of how long it will take for each of the jobs 110-120 to receive allocated resources, initialize operations if needed, and execute job logic. Such estimates, however, may be inaccurate to varying degrees, and may change over time as the workload progresses.

For example, jobs may take longer than expected, due to unexpected resource constraints or unexpected levels of processing being required. Thus, even if an estimate for workload completion determined by the scheduler 122 at a start of the job 110 is accurate at the time of estimate, the estimate may change over time and before completion of the final job 120.

In the example of FIG. 1, a slack manager 126 may be configured to calculate a predicted difference between a workload's final deadline and a currently-predicted completion time. For example, the jobs 110-120 may be required by a relevant SLA to complete by midnight (i.e., the workload's final deadline). If the scheduler 122 predicts that the jobs 110-120 will complete by 11:58 pm, then the difference of 2 minutes represents a slack time or margin of error in the predicted or projected completion time provided by the scheduler 122.

Since the predicted completion time may change as noted above, and assuming a defined deadline exists, then the slack time may dynamically change, as well. For example, continuing the above scenario, the job 110 may complete 1 minute sooner than its predicted completion time, which would increase the slack time to 3 minutes. Conversely, the job 110 may complete 1 minute later than predicted, thereby decreasing the slack time to 1 minute.

In order to ensure deadline compliance, it may be possible for the scheduler 122 to simply allocate additional resources (e.g., virtual machines, processing resources, and/or memory). However, allocating additional resources in a brute force manner may be costly, inefficient, and ineffective.

For example, resources that are allocated pre-emptively and in bulk to ensure deadline compliance may result in such resources being allocated but unused for unacceptable lengths of time. Allocating and reserving resources may incur additional costs, e.g., when the cluster 108 is part of a private or public cloud. Further, even if resources are assigned to ensure some jobs complete on time, a result may be starvation of other jobs (perhaps of other workloads) from having access to needed resources.

In contrast, as noted above and described in more detail, below, the job accelerator 102 may be configured to selectively accelerate individual jobs of the jobs 110-120, e.g., by starting job preparation operations (e.g., resource allocation) of such individual jobs earlier than a scheduled job start time assigned by the scheduler 122. Then, when the scheduler job start time is reached, the actual job logic operations of the accelerated job may commence immediately at that point.

For example, the job accelerator 102 may be provided with an application program interface (API) repository 128 which may contain and/or enable instrumentation of jobs of the jobs 110-120 to provide the types of job acceleration just referenced. Various types of such job instrumentation are described in detail, below, or would be apparent to one of skill in the art. In general, however, the API repository 128 may be understood to include or provide one or more types of code or other information that may be used in the context of the development environment 106 to perform the types of job instrumentation described herein.

For example, the API repository 128 may include multiple libraries, each of which may be compatible with, or used in, various types of development environments. A user of the job accelerator 102 may thus select a library compatible with the particular development environment 106, so that jobs within the active jobs repository 124 may be instrumented with an appropriate library and associated API to enable operations of the job accelerator 102. Other types of job instrumentation are possible and described herein, as well, not all of which may require use of the API repository 128.

In FIG. 1, the job accelerator 102 also includes a register 130. When using the API repository 128 or otherwise instrumenting the jobs 110-120, the resulting instrumented jobs may be registered with the register 130. Then, during initial executions of the instrumented jobs, the instrumentation may cause the instrumented jobs to report relevant job statistics, illustrated in FIG. 1 as job statistics 132.

For example, an instrumented job may report a length of time of job preparation operations for that job (e.g., resource allocation, as described above). In other examples, the instrumented job may include a report of a length of time of job initialization operations, if relevant and if corresponding instrumentation enables such reporting. For example, for an instrumented job that includes job preparation operations and job initialization operations (e.g., as described below with respect to FIG. 6), the instrumented job may send notifications of completion of the job preparation operations, including completion of the job initialization operations, to the register 130, e.g., for collection in the job statistics 132.

Once sufficient job statistics have been collected, a path monitor 134 may monitor one or more paths through jobs of one or more workloads within the cluster 108, including some or all of the jobs 110-120. The path monitor 134 may provide such monitoring periodically, intermittently, or in response to some defined trigger.

For example, the path monitor 134 may traverse an entirety or a remaining portion of a workload of jobs, such as the jobs 110-120 or portions thereof. As described below, the path monitor 134 may thus determine whether job acceleration is required, and, if so, may identify an optimal subset of jobs to accelerate.

As shown, the path monitor 134 includes a slack threshold monitor 136. The slack threshold monitor 136 may compare a current slack time, for a path of jobs being traversed and evaluated by the path monitor 134, with a pre-defined slack threshold. If the current slack time is less than or equal to the slack threshold as determined by the slack threshold monitor 136, then a job selector 138 may provide analysis to select one or more jobs for acceleration, to thereby obtain an improved slack time that greater than the slack threshold.

For example, in the simplified example given above, the jobs 110-120 may be required to complete by midnight and but may be currently predicted by the slack manager to finish at 11:58 pm. If the slack threshold is 3 minutes, then the slack threshold monitor 134 may determine that the slack threshold is not met.

Accordingly, the job selector 138 may determine that the job 120 may be accelerated by 2 minutes, using the techniques described herein. In such a scenario, the job 120 would finish at 11:56, the slack time would be 4 minutes, and the minimum slack threshold of 3 minutes would then be met.

For example, a start manager 140 may use the job statistics 132 to double-schedule the job 120, e.g., by scheduling job preparation operations of the job 120 at a time earlier than the originally scheduled job start time of the job 120, and then starting the job logic operations of the job 120 at the original job start time (and/or in response to completion of a required event). In this way, all necessary job preparation operations may be completed, and all necessary computing resources may be maintained in a held, waiting, or hot state, so that relevant job logic operations may be initiated immediately at the original job start time.

For example, as shown, the start manager 140 may include a preparations trigger 142 that triggers a start of job preparation operations of the job 120 at a scheduled job preparations start time that enables completion of the job preparation operations at or before the originally-scheduled job start time. If the job preparation operations complete prior to the originally scheduled job start time, then the job 120 may enter a waiting or held state as noted above. Then, a release trigger 144 may trigger a release of the job 120 to process the job logic operations at the originally scheduled job start time (and/or in response to a detected, required event) so that the job logic operations, and thus the job 120 as a whole, may complete at or before the slack threshold.

Put another way, job preparation operations for the job 120 prior to a scheduled job start time for the job 120, the job preparation operations of the job 120 may occur at least partially in parallel with job operations of the job 116, even though job logic operations of the job 116 may be required to be completed prior to initiation of job logic operations of the job 120. Additional explanation and illustrations of operations of the start manager 140 are provided below, with respect to FIG. 2.

The above example scenario provides a simplified scenario in which only the job 120 is accelerated. However, as also illustrated and described with respect to FIG. 2, multiple jobs may be accelerated, based on operations of the job selector 138.

For example, the job selector 138 may select a minimum number of jobs to accelerate that are required to satisfy the slack threshold. The job selector 138 may select jobs that will provide the most benefit when accelerated, such as jobs that have relatively lengthy job preparation operations, compared to corresponding job logic operations. In some examples, the job selector 138 may select a sequence or combination of jobs that are pre-defined as being an important or critical path with respect to accomplishing a related goal, e.g., a business critical path associated with accomplishment of a business goal.

In the simplified example of FIG. 1, the job accelerator 102, the workload automation engine 104, and the development environment 106 are illustrated as being executed using at least one computing device 146, which is illustrated as including at least one processor 148 and a non-transitory computer-readable storage medium 150. It will be appreciated that the at least one computing device 146 may represent multiple computing devices in communication with one another. In some examples, the at least one computing device 146 may represent a server, a workstation, a cloud-based virtual machine, or a mainframe computing device.

In FIG. 1, the job accelerator 102, the workload automation engine 104, and the development environment 106 are illustrated as three separate component or modules, having the various sub-modules shown and described. In various other examples, however, the job accelerator 102, the workload automation engine 104, and the development environment 106 may be implemented at least partially together, such as when the job accelerator 102 (or portions thereof) are implemented in the context of the workflow automation engine 104. Similarly, various ones of the sub-modules may be combined, or may have their functions divided for separate implementation.

Figure 2:
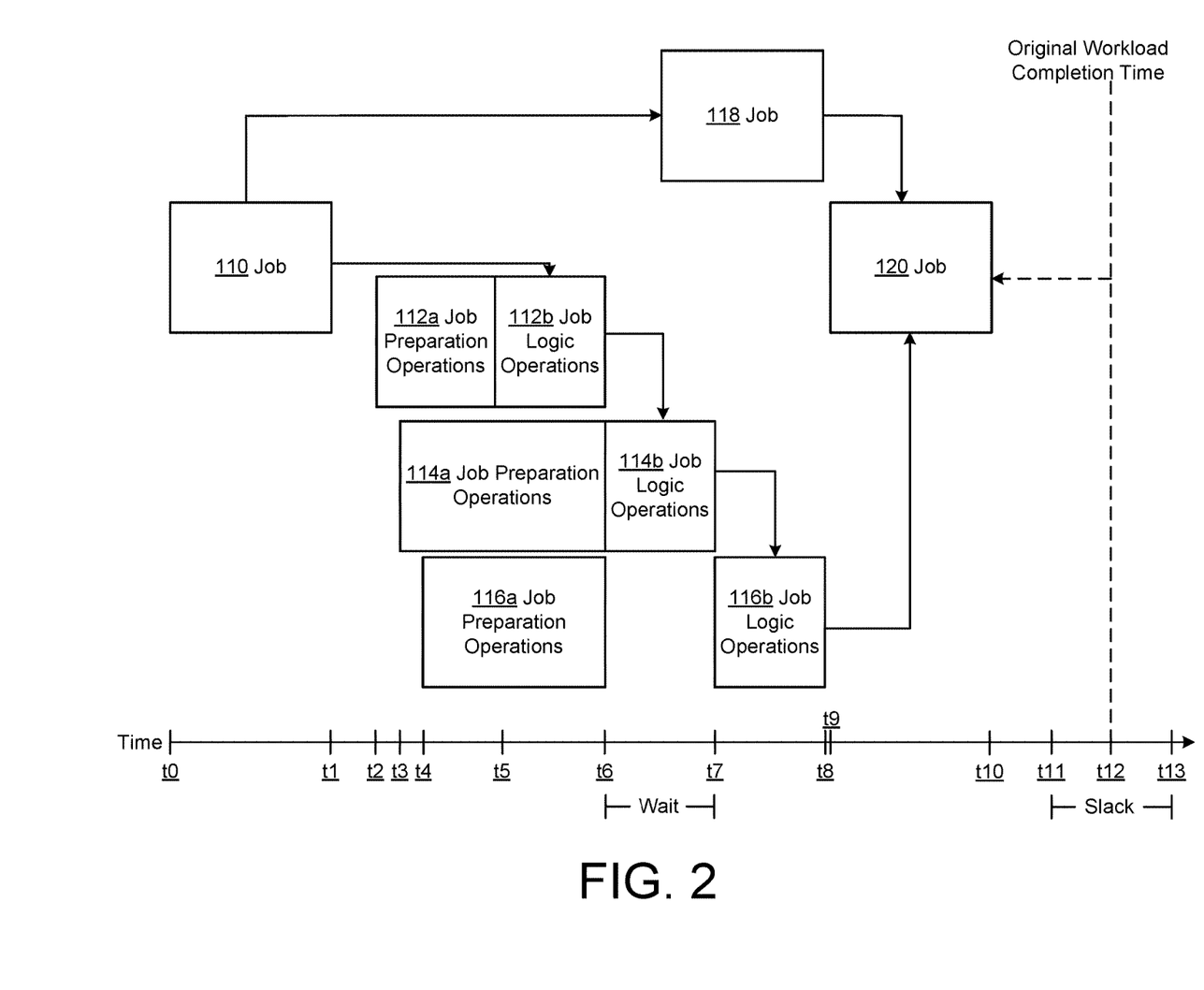
FIG. 2 is a timing diagram illustrating an example job acceleration that may be performed using the system of FIG. 1.

FIG. 2 is a timing diagram illustrating an example job acceleration that may be performed using the system of FIG. 1. As shown, FIG. 2 illustrates an example in which the workload of FIG. 1 that includes jobs 110-120 is accelerated.

The simplified example of FIG. 2 illustrates a relative time scale with points in time illustrated as t0-t13, in which t0 corresponds to a job start time for the job 110, t13 represents a final deadline by which the final job 120 must be completed (e.g., to satisfy a corresponding SLA), and t11 represents a time by which the final job 120 should be completed in order to maintain a desired or required quantity of slack.

That is, as explained above with respect to the slack manager 126 and the slack threshold monitor 136, a time period between time t11 and t13 may define a permissible slack time that provides a sufficient margin of error to ensure workload completion prior to an actual, final deadline. In the example of FIG. 2, it is assumed that FIG. 1 illustrates an example in which the job 120 will complete after the time t11 (e.g., at a time t12), and that the accelerated workload of FIG. 2 completes at a time t10 that is prior to the time tn. In other words, the operations of the job accelerator 102 accelerate completion of the illustrated workload of jobs 110-120 from a time t12, which is undesirably within a slack threshold, to a time t10, which is earlier than the slack threshold at time tn.

In other example implementations, however, slack may not be required to perform desired job accelerations. For example, job acceleration may be measured with respect to a final deadline at t13, and any job or workload completing at or after the final deadline of t13 may be accelerated to complete prior to the deadline at t13. In such cases, the slack threshold may be considered to be equal to zero.

In the example of FIG. 1, it is illustrated that the job 118 executes in parallel with the series execution of the jobs 112, 114, 116. Further, it is assumed that the final job 120 may not commence until both the job 118 and the job 116 have both completed. Thus, by accelerating execution of the jobs 112, 114, 116 as described below and illustrated in FIG. 2, the job accelerator 102 may ensure that the job 116 and the job 118 complete by a time t8, so that the job 120 may start shortly thereafter at a time t9 and complete by the time t10.

FIG. 2 illustrates that the job 112 includes job preparation operations 112a and job logic operations 112b, the job 114 includes job preparation operations 114a and job logic operations 114b, and the job 116 includes job preparation operations 116a and job logic operations 116b. Of course, the jobs 110, 118, 120 may also include separate job preparation operations and job logic operations as well, and any of the jobs 110-120 may include other types of job operations, such as job initialization operations (as referenced above and illustrated and described in more detail, below, with respect to FIGS. 6 and 7).

As referenced above, the job logic operations 112b, 114b, 116b may include any actions performed by or using resources of the cluster 108 to execute a function and/or obtain a result associated with a corresponding job. In other words, job logic operations 112b, 114b, 116b process input data, including data received from an earlier job, to obtain output data, which may be provided as output of the overall workload or provided to a subsequent job of the workload.

In contrast, the job preparation operations 112a, 114a, 116a may include any actions executed by the workload automation engine 104 to allocate resources of the cluster 108 for use in performing corresponding job logic operations 112b, 114b, 116b. As described herein, and appreciated by one of skill in the art, such job preparation operations may include, e.g., allocating a defined quantity of processing, memory, and/or storage resources. Such job preparation operations may include, in additional examples, loading an executable program, a quantity of data, or a streamed image into the allocated memory or storage. In further examples, job preparation operations may include providing a virtual resource, such as a virtual machine. In more specific examples, such virtual resources may include a pod, node, or container dedicated to performing corresponding job logic operations.

Job preparation operations may also include actions related to configuring allocated resources of the cluster 108. For example, a communication channel, port, or data connection may be parameterized. In other examples, job preparation operations may include actions related to isolating or securing the allocated resources, such as providing a specific namespace to be used.

In some examples, one or more of the job preparation operations 112a, 114a, 116a may include, or may be provided in conjunction with, job initialization operations, not shown separately in the simplified example of FIG. 2. In general, such job initialization operations may refer to actions taken to provide a correct or desired initial state(s), value(s), or condition(s) of hardware or software otherwise provided during the job preparation operations. More specific examples of job initialization operations are provided below with respect to FIGS. 6 and 7, or would otherwise be apparent to one of skill in the art.

As illustrated in FIG. 2, the job 112 includes job preparation operations 112a that span a time interval (t5-t2), and job logic operations 112b that span a time interval of (t6-t5). The job 114 includes job preparation operations 114a that span a time interval (t6-t3), and job logic operations 114b that span a time interval of (t7-t6). The job 116 includes job preparation operations 116a that span a time interval (t6-t4), and job logic operations 116b that span a time interval of (t8-t7).

In order to accelerate the workload completion from an original workload completion time at time t12 to an accelerated workload completion time at t10, the job accelerator 102 may be configured to schedule the job preparation operations 114a, 116a earlier than original, corresponding job start times for the jobs 114 and 116 in FIG. 1. Accordingly, required resources and processing for executing the job logic operations 114b may be maintained and ready to execute as soon as the job logic operations 112b complete, and, similarly, required resources and processing for executing the job logic operations 116b may be maintained and ready to execute as soon as the job logic operations 114b complete.

Put another way, and as illustrated, the job accelerator 102 modifies the originally scheduled workload of FIG. 1 so that the serial execution of the jobs 112, 114, 116 is transformed into a serial execution of the job logic operations 112b, 114b, 116b, while the corresponding job preparation operations 112a, 114a, 116a occur at least partially in parallel with one another. Consequently, in FIG. 2, both the job 116 and the job 118 complete at time t8, so that the final job 120 may begin shortly thereafter at a time t9, and the job 120 (and the workload as a whole) completes at accelerated completion time t10, and outside of the slack threshold at time tn. In contrast, in FIG. 1 and without job acceleration, the job 120 waits for completion of the job 116 even though the job 118 has already previously completed prior to a start of the job 116, thereby delaying the original workload completion time t12 and resulting in an unacceptably small quantity of slack (i.e., the time t12 is within the slack threshold).

As described herein, in order to accelerate the job preparation operations 114a, 116a, the job accelerator 102 may utilize the job statistics 132 to determine a job preparation time (i.e., duration, or timespan) required for each of the job preparation operations 114a, 116a. Then, the job accelerator 102 may cause the scheduler 122 to accelerate the job 114 from an original job start time to an earlier time, referred to herein as a job preparation start time (t3 in FIG. 2). Similarly, the job accelerator 102 may cause the scheduler 122 to accelerate the job 116 from its original job start time to an earlier job preparation start time of t4.

Since the new job preparation start times t3, t4 are based on the job statistics 132, the job accelerator 102 may select the job preparation start times t3, t4 with a high degree of confidence that the job preparation operations 114a, 116a will complete in time for job logic operations 114b, 116b to start as soon as possible (e.g., as soon as any other job start conditions are fulfilled). In some cases, nonetheless, as shown in FIG. 2, the job preparation operations (e.g., the job preparation operations 116a) may complete prior to a job start condition(s) of corresponding job logic operations (e.g., corresponding job logic operations 116b). As described herein, the start manager 140 of the job accelerator 102 may be configured to hold the execution of the job logic operations (e.g., the job logic operations 116b) until corresponding job start conditions have been met.

For example, the job preparation operations 116a may be estimated, based on the job statistics 132, to have a duration of t7-t4. There may be a margin of error or uncertainty associated with the estimation, so that, in an actual workload implementation, the job preparation operations 116a may have a duration of t6-t4, resulting in a wait period of (t7-t6), as shown.

In other examples, the job preparation operations 116a may be estimated correctly to complete at the time t6 as shown, or may complete within a margin of error at a time between t6 and t7, but some other wait condition may be present. For example, the job logic operations 114b may take longer to complete than anticipated, and the job logic operations 116b may be required to wait for the output of the job logic operations 114b before commencing.

In these and similar scenarios, the job preparation operations 116a may be configured to issue a wait command, which may also be referred to as a hold command, to ensure that the resources allocated during the job preparation operations 116a and needed for the job logic operations 116b are held until preceding job logic operations 114b complete and have created any output data that may be needed as input data to execute the job logic operations 116b.

In some implementations, it may be possible to accelerate additional jobs, schedule job preparation start times sooner, or otherwise accelerate a completion of the workload or portions thereof. Such additional steps may be successful in accelerating the overall workload to complete even earlier than in the example of FIG. 2, and provide additional margin of error in meeting the minimum slack threshold (e.g., completing job 120 at a time earlier than time t10).

However, taking such an approach may be unnecessary and costly. For example, if the time t13 is sufficient to meet requirements of an SLA, and the slack threshold at time t11 is sufficient to ensure that the deadline at time t13 is met, then any further pre-allocation of resources will result in monopolization of those resources with respect to being used for other jobs, or other workloads.

Using the techniques described herein, it is possible to optimally accelerate a subset of jobs needed to meet a required deadline, so that corresponding acceleration operations (which consume resources as just referenced) are minimized. Moreover, such optimal acceleration operations may be conducted dynamically in an ongoing basis as jobs complete, so that any unexpected delays may be further compensated by additional job acceleration operations, but only as needed to make sure relevant constraints are met. For example, the various job paths may be traversed on a regular interval or other schedule (e.g., every X seconds or minutes) to identify critical job path(s) and jobs for accelerations, and to ensure that the slack threshold or other deadline will be met.

Figure 3:
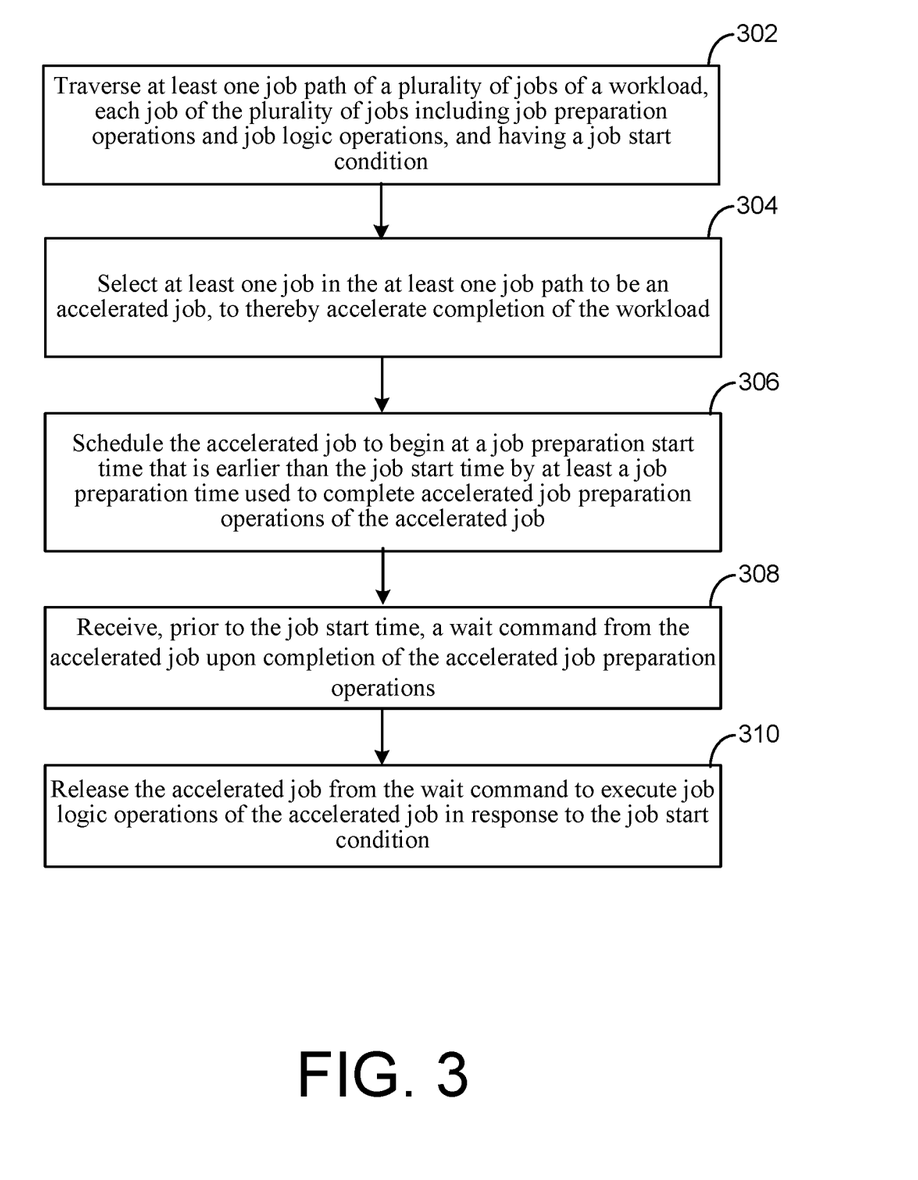
FIG. 3 is a flowchart illustrating example operations of the system of FIG. 1.

FIG. 3 is a flowchart illustrating example operations of the system of FIG. 1. In the example of FIG. 3, operations 302-310 are illustrated as separate, sequential operations. In various implementations, the operations 302-310 may include sub-operations, may be performed in a different order, may include alternative or additional operations, or may omit one or more operations. Further, in all such implementations, included operations may be performed in an iterative, looped, nested, or branched fashion.

In the example of FIG. 3, at least one job path of a plurality of jobs of a workload is traversed, each job of the plurality of jobs including job preparation operations and job logic operations, and having a job start condition (302). For example, the path monitor 134 of FIG. 1 may monitor the workload having tasks 110-120 running on the cluster 108, e.g., using the workload automation engine 104. In various implementations, a workload may be understood to be any collection of jobs associated with a deadline, SLA/and/or other completion requirement(s). Therefore, a workload may be a discrete set of jobs, or may be a subset of a larger set of tasks.

As described herein, the job preparation operations of each job may include operations associated with allocating computing and/or network resources of the cluster 108. The job preparation operations may include, or be associated with, job initialization operations designed to prepare the allocated resources to commence the job logic operations in a fast and efficient manner. The job logic operations refer to processing of data associated with completion requirements of the workload, and may include or require job data received from preceding jobs of the workload. Accordingly, various job start conditions may be defined, as well, including a specified time, event, availability of required data, and/or completion of an earlier job.

In example implementations, the path monitor 134 may use the slack threshold monitor 136 to determine that the workload being monitored is not predicted to complete in time to meet a specified minimum slack threshold, as described above with respect to FIGS. 1 and 2. In some examples, the path monitor 134 may use the slack threshold monitor 136 to determine that the workload being monitored is not predicted to complete in time to meet a required deadline (e.g., the slack threshold may be set to zero). Workload completion predictions may be made using various factors, such as a time needed to complete a workload during previous workload executions, perhaps adjusted by constraints or parameters associated with a current workload execution.

At least one job in the at least one job path may be selected to be an accelerated job, to thereby accelerate completion of the workload (304). For example, the job selector 138 of FIG. 1 may select the job 120 to be accelerated, as described above in the example of FIG. 1. In the example of FIG. 2, the job selector 138 is described as selecting the job 114 and the job 116 for acceleration.

More generally, the job selector 138 may use any suitable algorithm(s) or techniques to compare a quantity of job acceleration needed to a quantity of job acceleration that may be obtained for each job being considered. Accordingly, the job selector 138 may select one or more jobs providing a minimum quantity of acceleration needed to meet an SLA or other job completion requirement(s), thereby conserving allocatable resources of the cluster 108 while still ensuring workload completion compliance requirements.

For example, as shown in FIG. 2, job preparation operations of different jobs may vary with respect to time consumed. For example, the job preparation operations 112a of (t5-t2) is less than the job preparation operations 114a of (t6-t3).

Additionally, the job selector 138 may be configured to account for a structure of the workload when selecting jobs for acceleration. For example, accelerating a job(s) in parallel with one another job(s) may only be useful to the extent that the parallel combination of jobs completes at an overall earlier time. For example, accelerating the job 118 by itself may not be useful if the job 116 is not also (directly or indirectly) accelerated, because the job 120 may not commence until both the job 116 and the job 118 are completed.

The accelerated job may be scheduled to begin at a job preparation start time that is earlier than the job start time by at least a job preparation time used to complete accelerated job preparation operations of the accelerated job (306). For example, the start manager 140 may be configured to cause the scheduler 122 to double schedule the accelerated job(s), e.g., to schedule the job preparation start time and also a job logic start time, either of which may be defined with respect to a condition, event, and/or time.

For example, in FIG. 2, the job 116 is provided a job preparation start time of t4, which is earlier than an original job start time of t7. Similarly, the job 114 is provided a job preparation start time of t3, which is earlier than an original job start time of t6.

Accordingly, the preparation trigger 142 of the start manager 140 of FIG. 1 may be configured to trigger the job preparation start time, e.g., upon completion of a preceding job, and/or at a designated time. For example, the preparation trigger 142 may cause the job preparation operations 114a to begin at the time t3, or may cause the job preparation operations 116a to begin at the time t4, as just noted.

Prior to the job start time, a wait command may be received from the accelerated job upon completion of the accelerated job preparation operations (308). For example, the release trigger 144 may receive a wait command (which may be referred to as a wait call, a wait indicator, a wait, a hold command, a hold indicator, or a hold, or similar terms) from the job 116 once the job preparation operations 116a are completed, leading to commencement of the wait time (t7-t6).

Then, the accelerated job may be released from the wait command to execute job logic operations of the accelerated job in response to the job start condition (310). For example, in FIG. 2, the accelerated job 116 may be released by the release trigger 144 to commence the job logic operations 116b, upon ending of the job logic operations 114b (i.e., the corresponding job start condition in the example).

Figure 4:
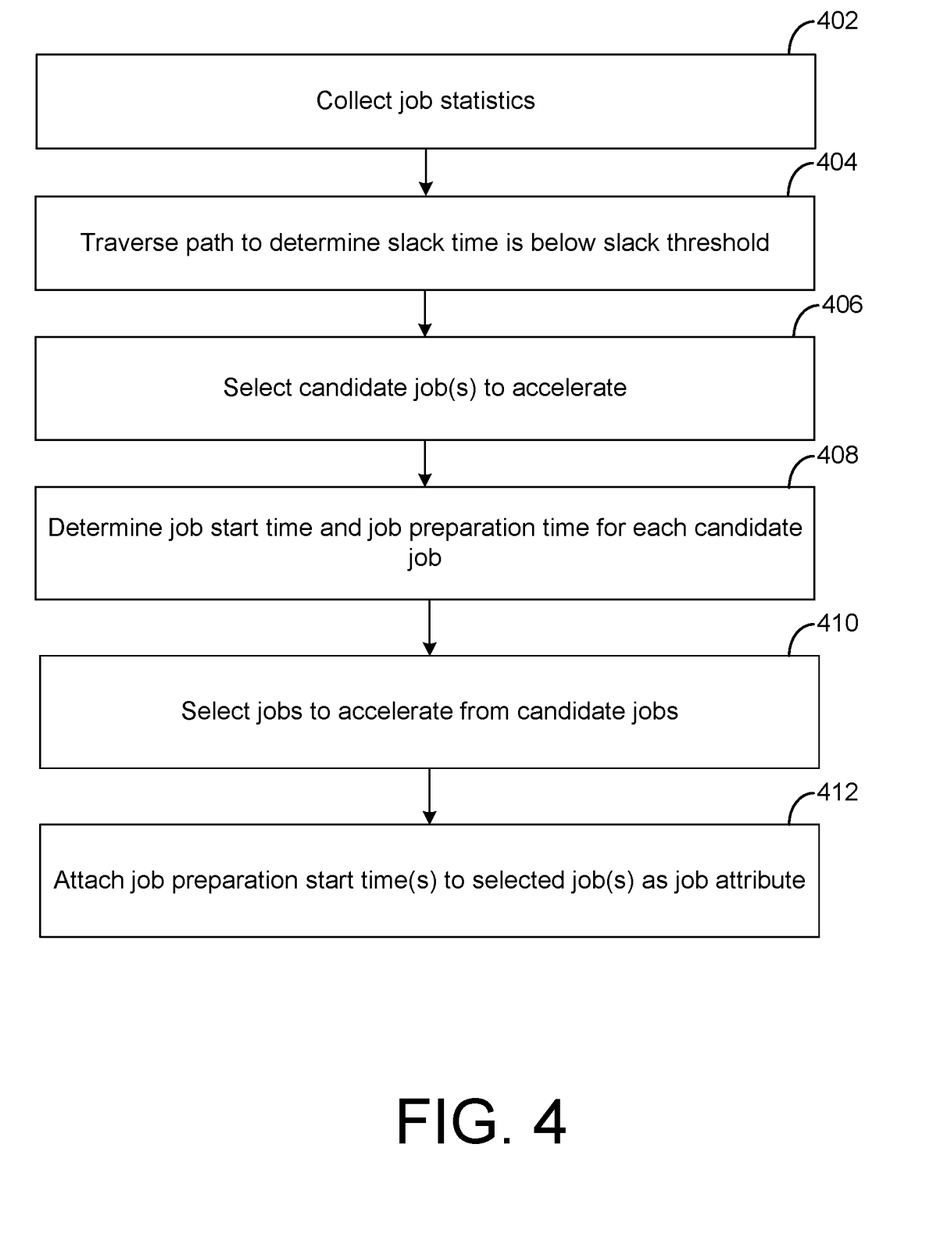
FIG. 4 is a flowchart illustrating operations for identifying, selecting, and configuring jobs for job acceleration.

FIG. 4 is a flowchart illustrating operations for identifying, selecting, and configuring jobs for job acceleration. In the example of FIG. 4, job statistics are collected (402). For example, each job (or a subset of the jobs) 110-120 may be instrumented to report a wait command, as noted above with respect to FIGS. 1-3. In example implementations, the same instrumentation may be used to report or register a statistics call indicating a duration of corresponding job preparation operations for each job, over multiple executions of each job, to thereby compile the job statistics 132.

Using the wait command to collect the job statistics 132 (e.g., receiving the wait command without actually initiating a wait during job statistic collection) may be efficient, since the wait command is already being used. However, job statistics 132 may be collected using different or additional approaches, as well. As noted, the job statistics 132 may be used to enable prediction of a duration(s) of job preparation operations of each instrumented job, within a margin of error or degree of uncertainty.

Once the job statistics 132 have been collected and a workload is progressing, one or more paths may be traversed to determine that a current slack time is below a designated slack threshold (404). For example, some paths may be selectable by users as being critical for some related purpose (e.g., a business purpose). In other examples, some paths may be critical because they are rate-limiting paths that are most likely to constrain initiation/completion of the workload as a whole. In some cases, depending on a number of paths in a workload, all paths may be traversed to monitor respective effects on the slack time.

Depending on the path chosen for acceleration, candidate job(s) for acceleration may be chosen (406). Some jobs may be eliminated as candidates for acceleration, e.g., if the jobs are not suitably instrumented or if accelerating the job(s) would not have an impact on accelerating the workload as a whole.

A job start time and job preparation time for each candidate job may be determined (408). For example, the scheduler 122 may be accessed to determine a currently-scheduled job start time, and the job statistics 132 may be accessed to determine a predicted job preparation time.

Jobs to be accelerated may be selected from the candidate jobs (410). For example, as noted above, jobs may have different quantities of job preparation operations required, and an extent of job acceleration needed to meet the slack threshold may depend on an extent to which the slack threshold was predicted to be exceeded. Accelerated jobs may be selected as a set of the candidate jobs needed to minimally exceed the slack threshold, and/or as a set of candidate jobs requiring the least total amount of resource allocation.

Resulting job preparation start times may then be added to the selected job(s) as a job attribute (412). For example, each job selected for acceleration may be configured so that the scheduler 122 will initiate the job at an accelerated job preparation start time. In specific examples, a traversal of the remaining path may be executed to add necessary start attributes to the jobs selected for acceleration. Consequently, when the scheduled job reaches its accelerated startup time as indicated by the added attribute, the workload automation engine 104 may be configured to initiate the job (e.g., the accelerated job preparation operations) at that time.

Figure 5:
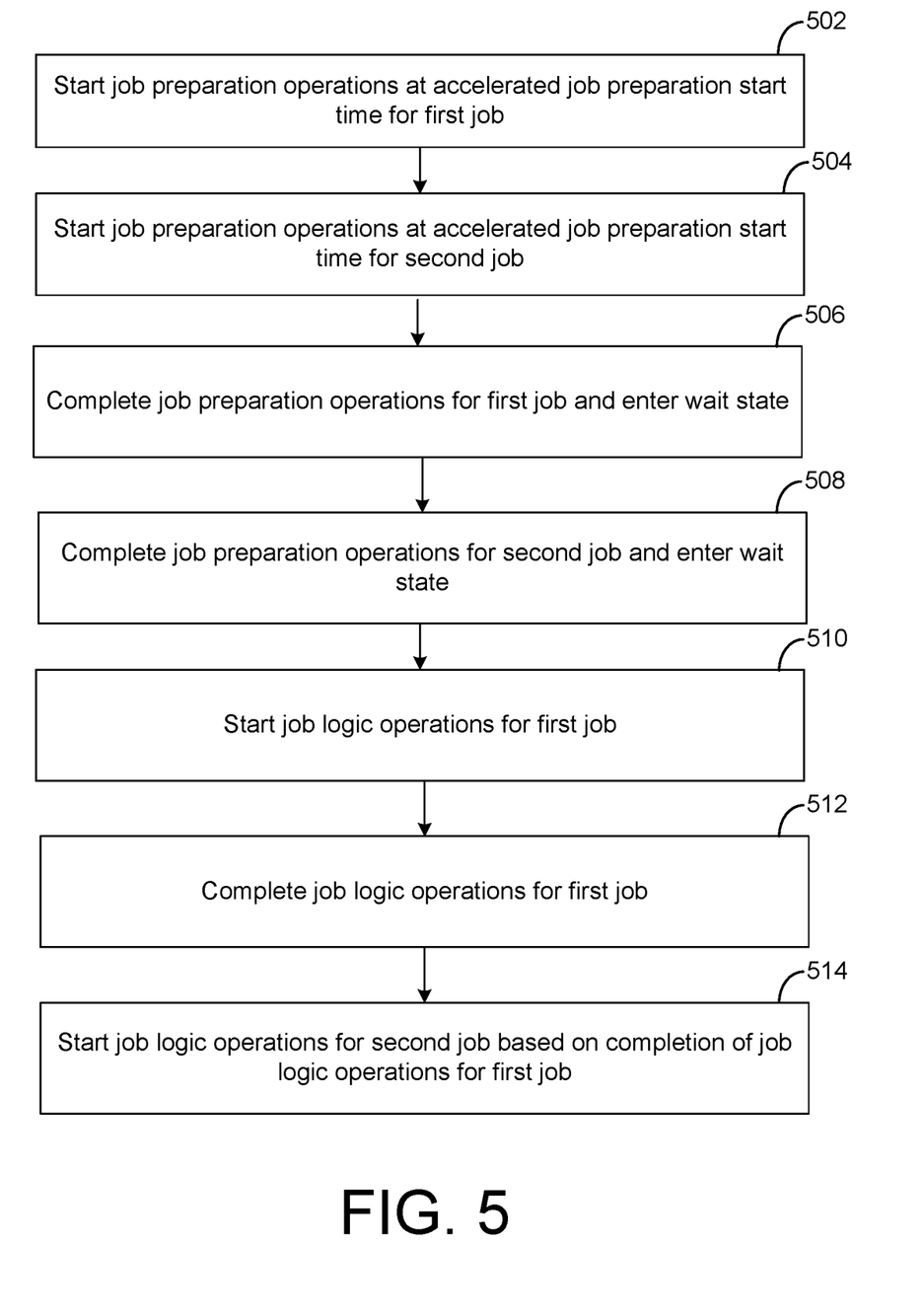
FIG. 5 is a flowchart illustrating operations for job acceleration.

FIG. 5 is a flowchart illustrating operations for job acceleration. As just noted with respect to FIG. 4, when the workload automation engine 104 reaches a first job with an accelerated job start time, such as the job 114 of FIG. 2, the job preparation operations of the first job may be commenced at its accelerated job preparation start time (502). Similarly, when the workload automation engine 104 reaches a second job with an accelerated job start time, such as the job 116 of FIG. 2, the job preparation operations of the second job may be commenced at its accelerated job preparation start time (504).

For example, the job preparation operations 114a are started at the time t3 in FIG. 2, and the job preparation operations 116a are started at the time t4 in FIG. 2. As illustrated and described, the job preparation operations 114a and the job preparation operations 116a thus proceed in parallel, even though the job 114 and the job 116 were originally scheduled in series, as shown in FIG. 1.

Then, the job preparation operations for the first job may complete and issue a wait call or wait command, causing the first job 114 to enter a wait state (506). Similarly, the job preparation operations for the second job may complete and issue a wait call or wait command, causing the second job 116 to enter a wait state (508).

The job logic operations for the first job may be commenced (510) and run until completion (512). Then, the job logic operations for the second job may start based on the completion of the job logic operations for the first job (514).

For example, in FIG. 2, the job preparation operations 114a may complete and issue a wait command, and the job logic operations 114b may be initiated immediately, or almost immediately. The job preparation operations 116a may complete and issue a wait command, and the job logic operations 116b may be unable to commence until synchronized with the completion of the job logic operations 114b.

Although FIG. 5, like FIG. 3 and FIG. 4, is illustrated as a series of consecutive operations, it will be appreciated that, as noted above, the operations may occur in a different order than shown, including two or more steps occurring in parallel. For example, the job logic operations of the first job may begin prior to completion of job preparation operations of the second job (e.g., operation 510 may occur prior to operation 508).

Figure 6:
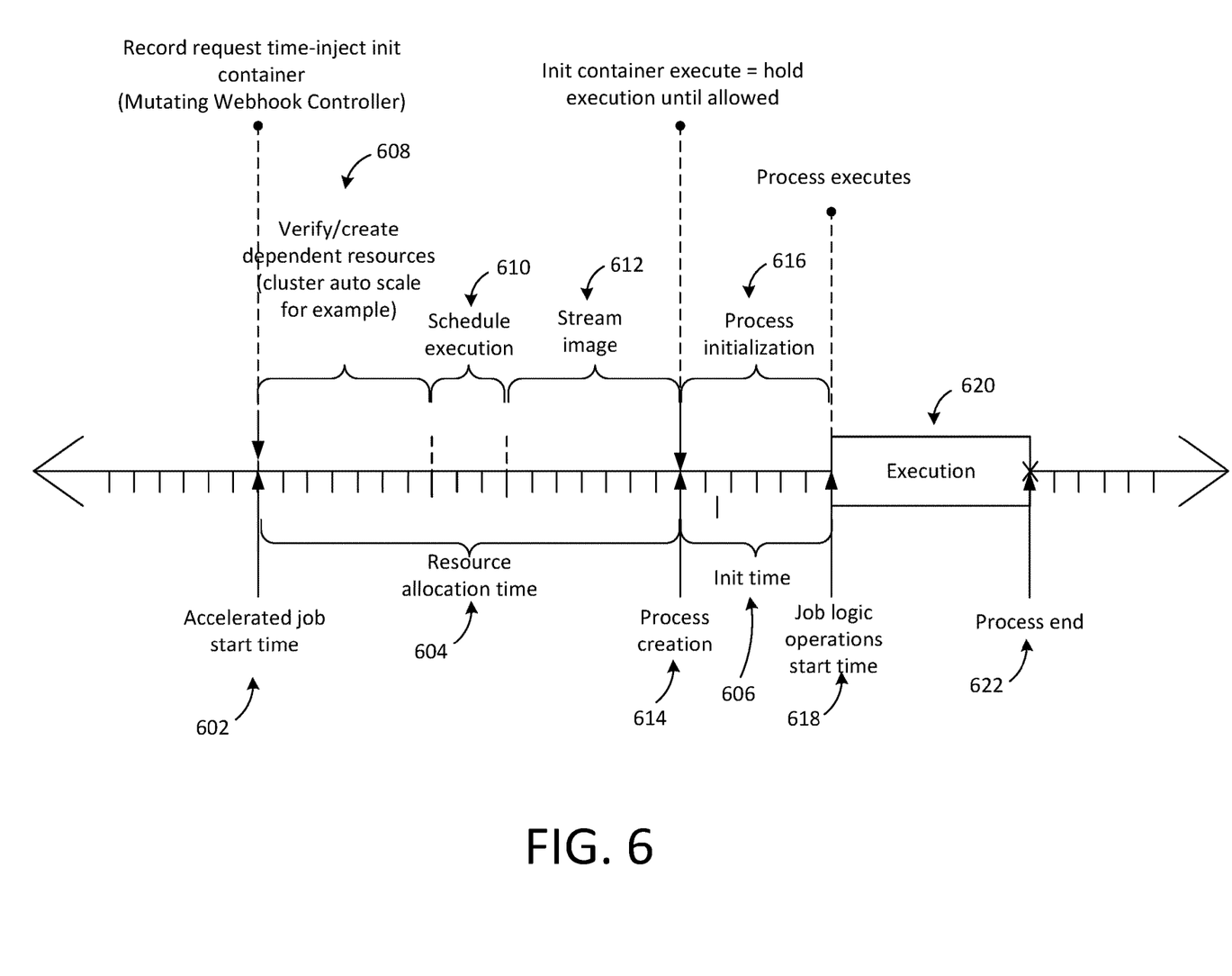
FIG. 6 is a timing diagram illustrating example operations of the system of FIG. 1.
Figure 7:
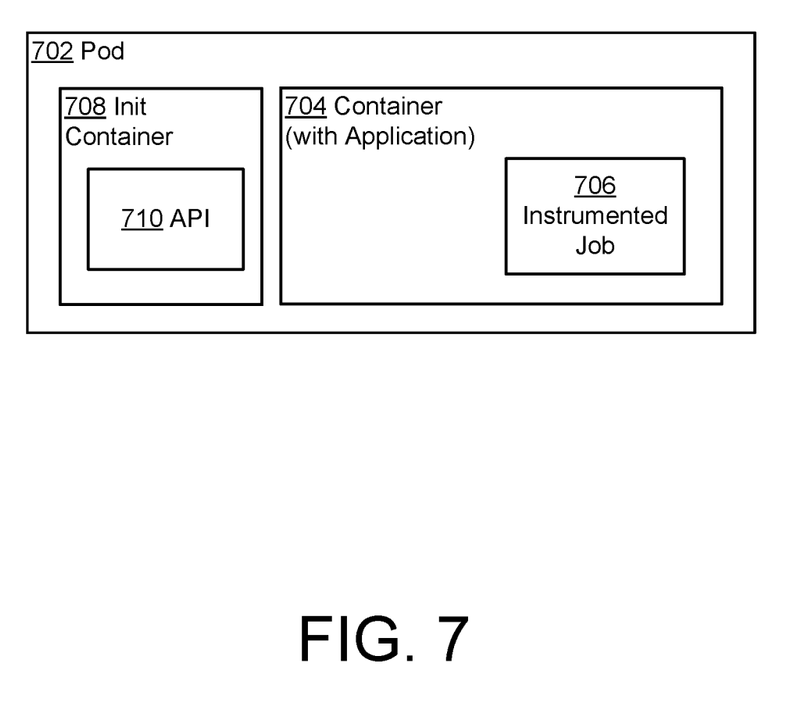
FIG. 7 is a block diagram illustrating an example job instrumentation that may be used in the examples of FIG. 1 and FIG. 6.

FIG. 6 is a timing diagram illustrating example operations of the system of FIG. 1. FIG. 7 is a block diagram illustrating an example job instrumentation that may be used in the examples of FIG. 1 and FIG. 6.

FIGS. 6 and 7 are provided in the example of Kubernetes, which is a container-based platform known to provide portability, reliability, and scalability, as well as various other features and advantages. It will be appreciated that FIGS. 6 and 7 are included for the purpose of providing an illustrative, non-limiting example of the techniques of FIGS. 1-5, and that many other implementations are possible, as well. For example, described techniques may be used in the context of Apache Spark clusters, e.g. running on the YARN (Yet Another Resource Manager) platform, or other suitable platform.

In the example of FIG. 6, and consistent with the above description of FIGS. 1-5, it is assumed that there is a critical workload running jobs using Kubernetes pods, where the critical workload is required to meet a business deadline or other SLA. As already described, a substantial part of the time for running such workloads may be consumed by obtaining required hardware resources and starting up the software, such as container images pulled from a repository and started in a Kubernetes pod (or, in other examples, a Spark cluster that needs to be initialized).

To solve the problem of accelerating the execution of the critical business workload to make sure that it finishes on time, while balancing resource usage for the various systems involved in the workload, the techniques of FIGS. 1-5 may be applied to the specific example problem of running a pod in Kubernetes.

Specifically, FIG. 6 illustrates a timeline of an accelerated job running in a Kubernetes pod. As shown in FIG. 6, an accelerated job start time 602 may be determined as described above. For example, a resource allocation time 604 and an initialization (init) time 606 may be determined as part of job preparation operations. As shown in the example, the resource allocation time 604 may include time 608 for verification/creation of dependent resources, such as auto-scaling cluster resources, time 610 for the scheduling of subsequent execution operations, and a time 612 for streaming one or more images to be used in the executing pod. The init time 606 may include time 616 for process initialization.

A job logic operations start time 618 represents the start of a time 620 for job execution, resulting in the process ending at time 622. As may be appreciated from the above description, the job logic operations start time 618 may represent an original start time associated with an original job start condition, which, in conventional systems, would be associated with the starting of the resource allocation time 604 (and subsequently the init time 606). By accelerating the beginning of the resource allocation time 604 (and subsequently the init time 606) earlier in time to the accelerated job start time 602, the resource allocation time 604 and the init time 606 may both be completed prior to the job logic operations start time 618. Consequently, as already illustrated in FIG. 2, the process end time 622 may be reached sooner than in conventional systems.

In more specific examples of FIG. 6, as referenced, the illustrated process may include starting an application pod that runs a container image(s). The resulting container may run specified processing to completion, at which point the pod goes down (which may be referred to as "running a pod to completion"). When running a pod to completion, the resource allocation time 604 may include, e.g., obtaining additional virtual machines, associating the pod to a specific virtual machine, and streaming the container image. Further in such examples, the init time 606, during which the container may be loaded to memory, and processes may begin to start up within the container, download artifacts, and establish connections.

FIG. 7 is a block diagram illustrating an example job instrumentation that may be implemented in the example of FIG. 6. In FIG. 7, a Kubernetes pod 702 implements a container 704 to run a desired application for executing an instrumented job 706. Further in FIG. 7, an init container 708 is included in the pod 702.

As described above, with more specific examples provided below, the instrumented job 706 may refer to any job that has been instrumented either intrusively (e.g., with changes to the job code) or non-intrusively (e.g., without changes to the job code), e.g., using the development environment 106 of FIG. 1. For example, in FIG. 7, the instrumented job 706 may be instrumented non-intrusively by including an API 710 and any associated library in the init container 708.

Then, during a pre-production phase, the API 710 may be exposed to collect job statistics and insert specific times into the job statistics, including, e.g., the time 602, the time 614, and the time 618 in FIG. 6. Each instrumented job may be run multiple times with the API 710 in a statistic gathering mode, in order to obtain reliable numbers, e.g., for the min, max and average of the resource allocation time 604 and the init time 606.

Later, during a production phase, the workload automation engine 104 may perform the following process for identified critical workloads, e.g., every X seconds. The workload automation engine 104 may calculate the slack time for the identified workload, and if the slack time is below the slack threshold, may proceed to traverse the critical path, and for each job on the path that has been instrumented, may calculate an accelerated job start time that is equal to (estimated start time−max resource allocation time−max init time). The accelerated job start time may then be added as an attribute to the instrumented job. Accordingly, the job may be scheduled early enough to save the resource allocation time 604 and the init time 606, but not so early as to consume resources for an undesirably long period of time.

Then, when an instrumented job reaches its accelerated job start time, the workload automation engine 104 may start the instrumented job, leading to completion of the resource allocation and initialization operations of FIG. 6. The instrumented job 706 will then go into a wait state once the API 710 is called. The instrumented job may be marked as an accelerated job.

When a job is selected for execution by the workload automation engine 104, and after all of its prerequisites are fulfilled, the job may be checked to see whether it was accelerated. If so, a persistent unique object associated with the job, such as a file, may be populated with relevant variables, which will post an event for which the API 710 is waiting. In such examples, once the event is posted, the data from the unique object may be loaded, the environment may be refreshed, and execution may be resumed. As noted above, various other techniques may be used to initiate resumption of the job execution.

In a specific example of non-intrusive job instrumentation, as shown in FIG. 6, a mutating webhook controller may be used to inject the init container 708. In this example, the webhook controller injects the init container 708 when the pod object is sent to the Kubernetes API Server for creation. The webhook may be used to modify the pod object to add the init container 708 to the spec inside the pod's configuration file. As an init container runs before its application container is started, the init container 708 may be used to call the API 710 that collects statistics and waits for an event. As described above, this approach allows collection of job statistics and accelerated starting of the job based on these job statistics.

In other examples, both resource allocation time 604 and init time 606 may be handled using intrusive instrumentation. In these examples, a developer may instrument job code by inserting an API call at a point at which process initialization finishes, and immediately prior to execution of job logic operations commencing. This approach may be combined with gathering statistics on resource allocation time 604 and init time 606 (e.g., if init container 708 is used).

In other examples, both resource allocation time 604 and init time 606 may be handled using non-intrusive instrumentation. For example, an external tool, e.g., dtrace on Linux, may be used to detect a certain event in the application code that marks the end of process initialization. For example, the first line written to a log file may represent such an event. This approach may also be combined with gathering statistics on resource allocation time 604 and init time 606, as described above.

Thus, in FIGS. 6 and 7, example solutions are provided for scenarios related to running pods to completion as part of a batch workload and utilizing the knowledge within a workload automation tool to start Kubernetes pods ahead of time. More generally, described implementations enable a workload automation tool to accelerate the execution of a workload along its critical path, thereby guaranteeing this workload meets its business deadline, and saving high monetary costs incurred when the workload does not finish on time.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, a server, a mainframe computer, multiple computers, or other kind(s) of digital computer(s). A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
    traverse a plurality of job paths of jobs of a workload, each job of the jobs including job preparation operations, job logic operations, and an original job start time, and having a job start condition;
    identify a job path within the plurality of job paths that defines a maximum duration for completion of the workload;
    select at least one job in the job path to be an accelerated job, to thereby accelerate the completion of the workload;
    schedule the accelerated job to begin at a job preparation start time that is earlier than the original job start time of the accelerated job by at least a job preparation duration used to complete accelerated job preparation operations of the accelerated job;
    receive, prior to the original job start time, a wait command from the accelerated job upon completion of the accelerated job preparation operations; and
    release the accelerated job from the wait command to execute the job logic operations of the accelerated job in response to the job start condition.

2. The computer program product of claim 1, wherein the instructions are further configured to cause the at least one computing device to:
    identify the job path as a rate-limiting path that is a most-limiting job path of the plurality of job paths of the workload with respect to the completion of the workload.

3. The computer program product of claim 1, wherein the job preparation operations include allocating computing and/or network resources to be used for the job logic operations, and the job logic operations include processing data to contribute to completing the workload using the allocated computer and/or network resources.

4. The computer program product of claim 3, wherein the job preparation operations include job initialization operations that include initializing the allocated computer and/or network resources to perform the job logic operations.

5. The computer program product of claim 1, wherein the instructions are further configured to cause the at least one computing device to:
    determine that the workload is predicted to finish after a completion deadline; and
    select the job path to accelerate the completion of the workload to finish prior to the completion deadline.

6. The computer program product of claim 1, wherein the instructions are further configured to cause the at least one computing device to:
    determine that the workload is predicted to finish within a minimum slack threshold; and
    select the job path to accelerate the completion of the workload to exceed the minimum slack threshold.

7. The computer program product of claim 1, wherein the instructions are further configured to cause the at least one computing device to:
    traverse the plurality of job paths at defined intervals as the workload progresses towards completion.

8. The computer program product of claim 1, wherein the instructions are further configured to cause the at least one computing device to:
    determine the job preparation duration for the at least one job based on statistical analysis of executions of the at least one job that occurred prior to the traversing of the plurality of job paths.

9. The computer program product of claim 1, wherein the at least one job is in serial execution with respect to a second job within the job path and prior to acceleration of the accelerated job, and further wherein the accelerated job preparation operations of the accelerated job are at least partially in parallel with second job logic operations of the second job.

10. The computer program product of claim 9, wherein the job start condition includes completion of the second job logic operations of the second job.

11. A computer-implemented method, the method comprising:
    traversing a plurality of job paths of jobs of a workload, each job of the jobs including job preparation operations, job logic operations, and an original job start time, and having a job start condition;
    identifying a job path within the plurality of job paths that defines a maximum duration for completion of the workload;
    selecting at least one job in the job path to be an accelerated job, to thereby accelerate the completion of the workload;
    scheduling the accelerated job to begin at a job preparation start time that is earlier than the original job start time of the accelerated job by at least a job preparation duration used to complete accelerated job preparation operations of the accelerated job;
    receiving, prior to the original job start time, a wait command from the accelerated job upon completion of the accelerated job preparation operations; and
    releasing the accelerated job from the wait command to execute the job logic operations of the accelerated job in response to the job start condition.

12. The method of claim 11, comprising:
- determining that the workload is predicted to finish within a minimum slack threshold; and
- selecting the job path to accelerate the completion of the workload to exceed the minimum slack threshold.

13. The method of claim 11, comprising:
- traversing the plurality of job paths at defined intervals as the workload progresses towards completion.

14. The method of claim 11, comprising:
- determining the job preparation duration for the at least one job based on statistical analysis of executions of the at least one job that occurred prior to the traversing of the plurality of jobs.

15. The method of claim 11, wherein the at least one job is in serial execution with respect to a second job within the job path and prior to acceleration of the accelerated job, and further wherein the accelerated job preparation operations of the accelerated job are at least partially in parallel with second job logic operations of the second job.

16. The method of claim 15, wherein the job start condition includes completion of the second job logic operations of the second job.

17. A system comprising:
- at least one memory including instructions; and
- at least one processor that is operably coupled to the at least one memory and that is arranged and configured to execute instructions that, when executed, cause the at least one processor to
- traverse a plurality of job paths of jobs of a workload, each job of the jobs including job preparation operations, job logic operations, and an original job start time, and having a job start condition;
- identify a job path within the plurality of job paths that defines a maximum duration for completion of the workload;
- select at least one job in the job path to be an accelerated job, to thereby accelerate the completion of the workload;
- schedule the accelerated job to begin at a job preparation start time that is earlier than the original job start time of the accelerated job by at least a job preparation duration used to complete accelerated job preparation operations of the accelerated job;
- receive, prior to the original job start time, a wait command from the accelerated job upon completion of the accelerated job preparation operations; and
- release the accelerated job from the wait command to execute the job logic operations of the accelerated job in response to the job start condition.

18. The system of claim 17, wherein the instructions are further configured to cause the at least one processor to:
- traverse the plurality of job paths at defined intervals as the workload progresses towards completion.

19. The system of claim 17, wherein the at least one job is in serial execution with respect to a second job within the job path and prior to acceleration of the accelerated job, and further wherein the accelerated job preparation operations of the accelerated job are at least partially in parallel with second job logic operations of the second job.

20. The system of claim 19, wherein the job start condition includes completion of the second job logic operations of the second job.

* * * * *